Figure 1:
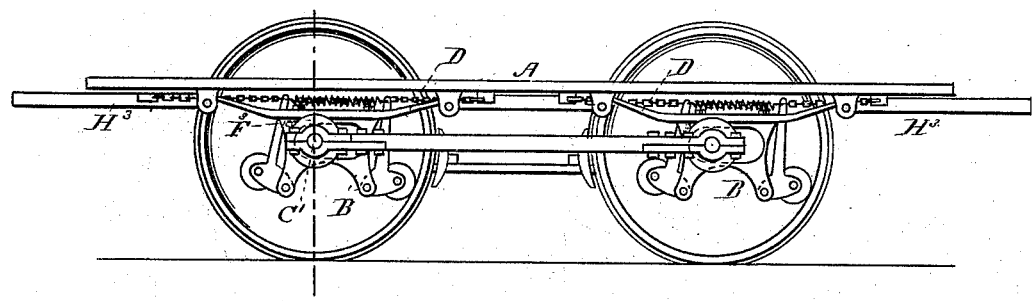

(No Model.)  2 Sheets—Sheet 1.

H. H. WATSON.
CAR STARTER.

No. 331,220.  Patented Nov. 24, 1885.

WITNESSES.  INVENTOR.

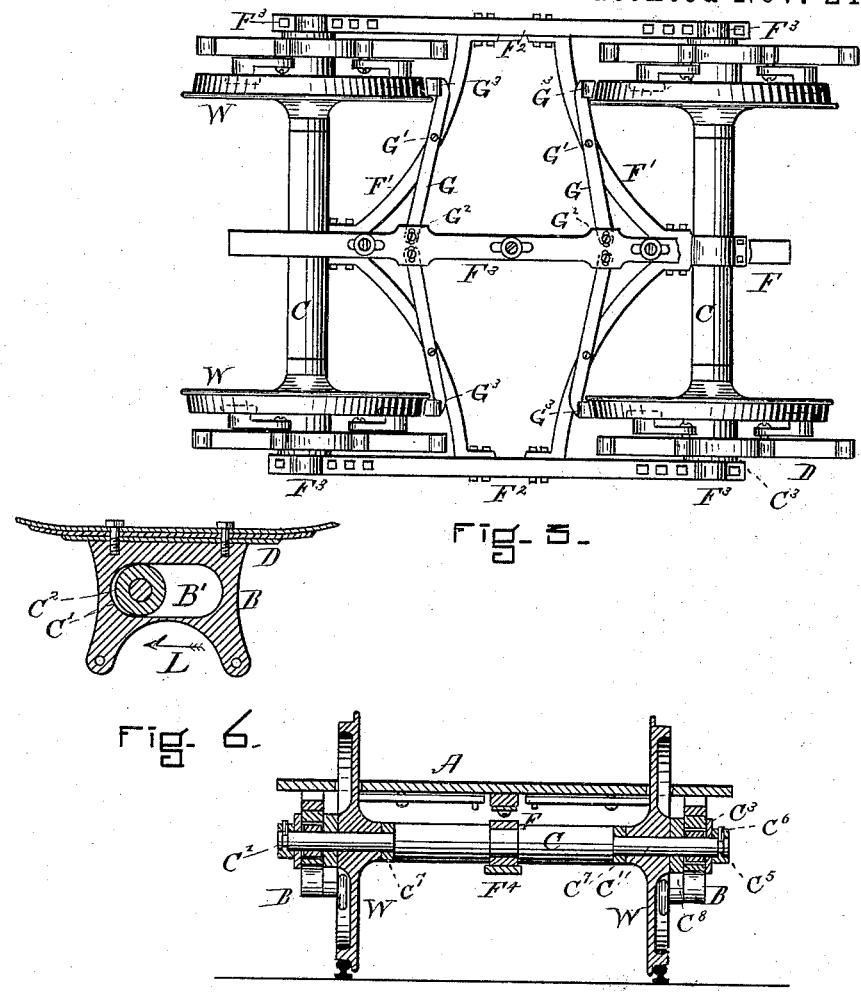

UNITED STATES PATENT OFFICE.

HENRY H. WATSON, OF WALTHAM, MASSACHUSETTS.

CAR-STARTER.

SPECIFICATION forming part of Letters Patent No. 331,220, dated November 24, 1885.

Application filed October 23, 1884. Serial No. 146,254. (No model.)

*To all whom it may concern:*

Be it known that I, HENRY H. WATSON, a citizen of the United States, residing at Waltham, in the county of Middlesex and State of Massachusetts, have invented certain new and useful Improvements in the Running-Gear of Cars, of which the following is a specification.

The object of my invention is so to construct the running-gear of a car that in starting the car can roll on the axle until it has started forward several feet, thereby helping the horses greatly in starting the load, and as a part of the weight of the load is forward of the vertical center and held in position by friction-wheels which bear on the inner flange of the car-wheels, the advantage thus gained must be continued as long as the horses are going forward.

In my invention the great advantage gained is in helping to start and propel all kinds of wheeled vehicles, especially horse-cars, and as applied to horse-cars is described as follows: By using a slotted housing moving backward or forward, as the case may require, on a movable ring which turns upon the journal of a loose axle, whereby a part of the weight of the load is conveyed over the vertical center and held in position by means of stationary projections from the housing, and by bent levers provided with small friction-wheels which bear upon an inner rim or flange of the car-wheel, by which means a considerable part of the load is conveyed from the axles to the rim or flange of the car-wheel, thereby causing the weight of the load to help in a great measure in starting and propelling the car; also, by this slotted housing and ring the load can move forward several feet before there is much draft required by the horses, as the ring turns upon the axle, and the housings to which the car is fastened can roll forward or backward, as upon a pair of rollers; also, an invention whereby the draft of the horses may be so applied to the movable levers on the housings as to cause the friction-wheels on said levers to move upward and downward upon the said rim or flange of the car-wheel, thereby causing a part of the weight forward of the vertical center to be pressed upon said rim or flange, and helping thereby to turn the wheels, (the device for same shown in drawings;) also, a loose wheel to be used upon a loose axle provided with disks $C^7$ $C^7$, $C^3$ $C^3$, and $C^8$ $C^8$, as shown in drawings, and described, whereby one or both wheels may turn upon said axle, or the axle and wheels may turn together, according as the friction may determine, said loose wheels and axles being of great service in helping to pass around curves, or making turns of all kinds; also, an invention for housings to trucks, as shown in drawings, by means of which both axles and wheels are held in permanent relation to each other, and in my present application they allow the car-body to be moved forward or backward, as may be required to start or stop the load, as the case may be. I attain these objects by the mechanism illustrated in the accompanying drawings, in which—

Figure 2:
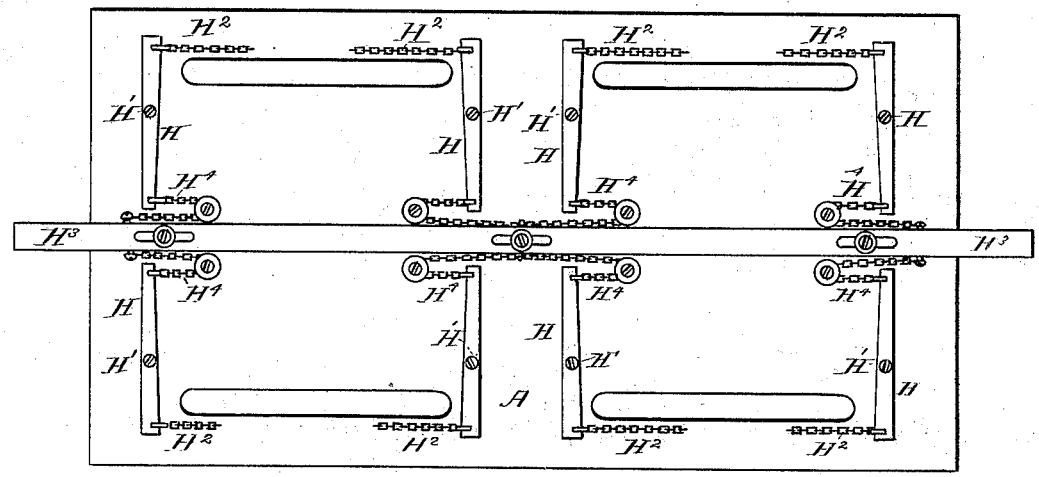

Figure 1 is a side elevation of a car provided with my invention. Fig. 2 is a plan view showing the under side of the car-body, and illustrating the system of chains and levers that are used to transmit the power of the horses to the friction-wheels. Fig. 3 is a plan of the truck and the brake devices. Fig. 4 is a cross vertical section through the truck. Fig. 5 is an elevation showing one of the wheels and its connecting parts enlarged, and Fig. 6 is a detail showing one of the housings.

In the drawings, A represents the body of the car; B B, the housings, which are attached to the body A by means of springs D.

The housings B, Figs. 1 and 4, are shown in detail in Fig. 6, and each is provided with an opening, B', in which a rolling collar, $C^2$, fits. This collar $C^2$ surmounts the end C' of the axle C, so that in starting the car in the direction indicated by the arrow L, Fig. 6, it will roll in the collar $C^2$ until the said collar comes near the rear end of the slot B'. By this time the car has accumulated momentum enough to greatly assist the horses in drawing it on the wheels proper as an ordinary car is drawn.

$C^3$, Fig. 4, represents a circular disk. A disk like the one represented at Fig. 3 is placed at each end of the rolling collar $C^2$ to keep it in place.

F, Fig. 3, is the center beam of the truck-frame, and has four branches, F', and outside bars, $F^2$. The axle C is journaled to the center bearer, F, as shown at $F^4$, Fig. 4.

G G G G represent the brake-levers pivoted at G', and connected at $G^2$ to a brake-bar, $F^3$, Fig. 3, the said brake-bar $F^3$ being arranged to slide on the central beam, F. This brake-bar $F^3$ is connected by a chain to the brake-wheel, and is operated in the ordinary manner.

I will now proceed to describe my device for taking advantage of the draft of the horses for the forward movement of the car. This device is illustrated more particularly in Figs. 2 and 5.

$H^3$, Figs. 2 and 5, represents the draw-bar passing under the body of the car, and has at its ends the ordinary devices for connecting the horses to the car. This draw-bar $H^3$ is connected by chains $H^4$ to the levers H, respectively, each of said levers having a pivot, (represented by $H'$.)

$H^2$ $H^2$ are chains which connect the outer ends of the levers H of Fig. 2 with the upper ends of the levers K of Fig. 5. These levers K are pivoted at $K'$ to the housing B, Fig. 5, and are connected at their upper ends by the spring S, which tends to draw the upper ends together. Within the spring S, I place a check-chain to limit the range of the spring.

$K^2$ represents small friction-wheels attached to the lower end of the lever K, and arranged so that they may alternately bear against the inner side of the flange $K^3$ of the wheels W.

By the above-described connection between the draw-bar $H^3$ and the friction-wheels $K^2$, I am enabled to utilize the power of the horses, in attaining the object of my invention, in assisting the forward movement of the car, since the forward motion of the upper end of the forward levers, K, will cause the wheel $K^2$ to descend, and in descending to have a tendency to push the wheel W around and facilitate the forward motion of the car.

I claim—

1. In the gear of a car, the combination of the draw-bar $H^3$, chains $H^4$ $H^4$, levers H, and chains $H^2$ $H^2$ with the levers K K, each provided with friction-wheels $K^2$, housings B, collars $C^2$, axle $C'$, and flange $K^3$, all operating together substantially as described, and for the purpose set forth.

2. In the running-gear of a car, the combination of the truck-frame $F^3$ $F^2$ $F^3$ F $F'$ $F'$ and housing $F^4$ with the loose revolving axle C and loose wheels W W, all operating together substantially as described, and for the purpose set forth.

3. In running-gear for cars, the combination of the wheel W, the housing B, secured to the frame of the car, provided with a slot, $B'$, of sufficient size to receive the axle of the wheel and permit its revolving and longitudinal play, the axle C $C'$ and guide $C^2$, and friction-rollers secured to the frame and operating upon the wheel, substantially as described.

HENRY H. WATSON.

Witnesses:
 WILLIAM EDSON,
 CHARLES E. WILSON.